Patented Apr. 21, 1925.

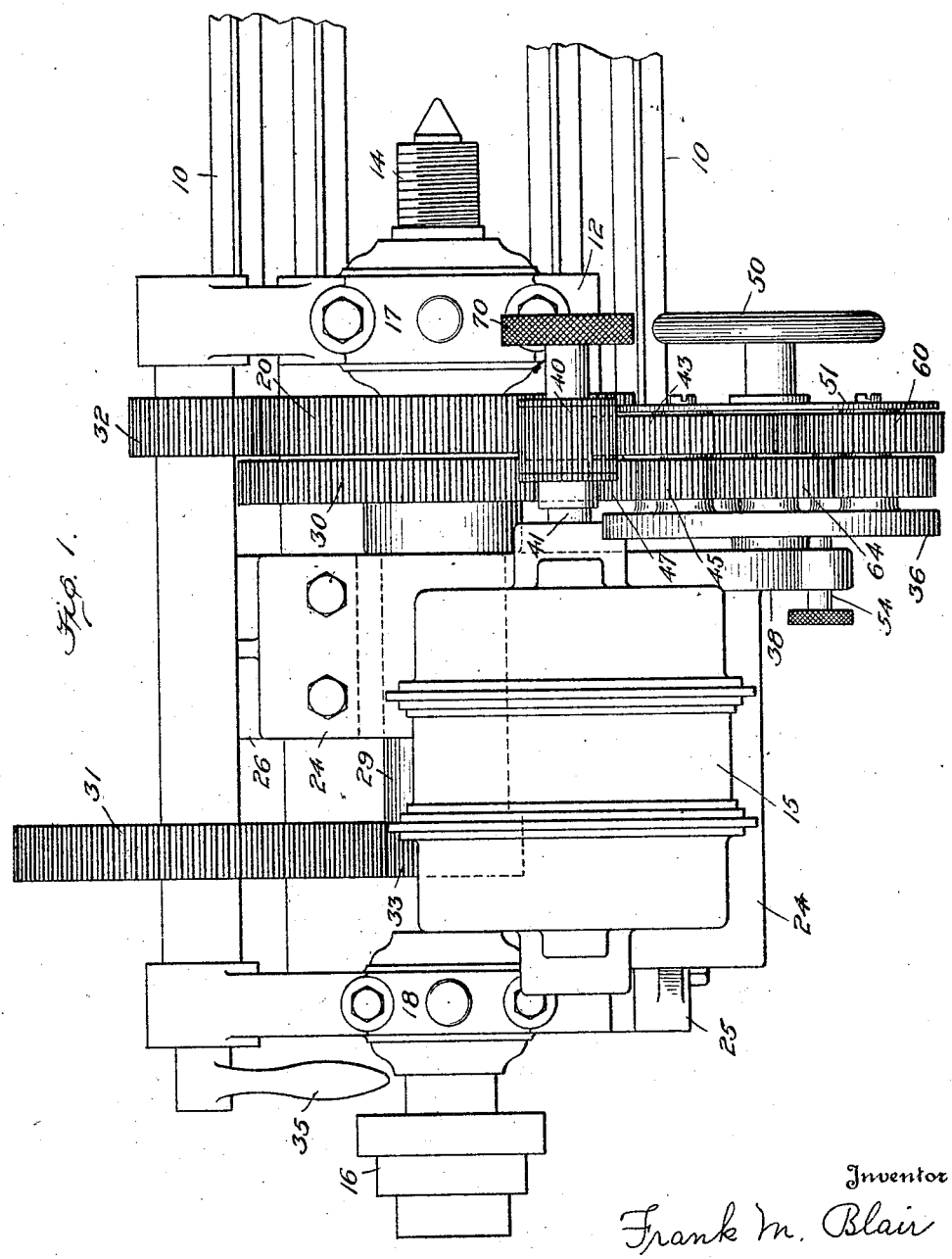

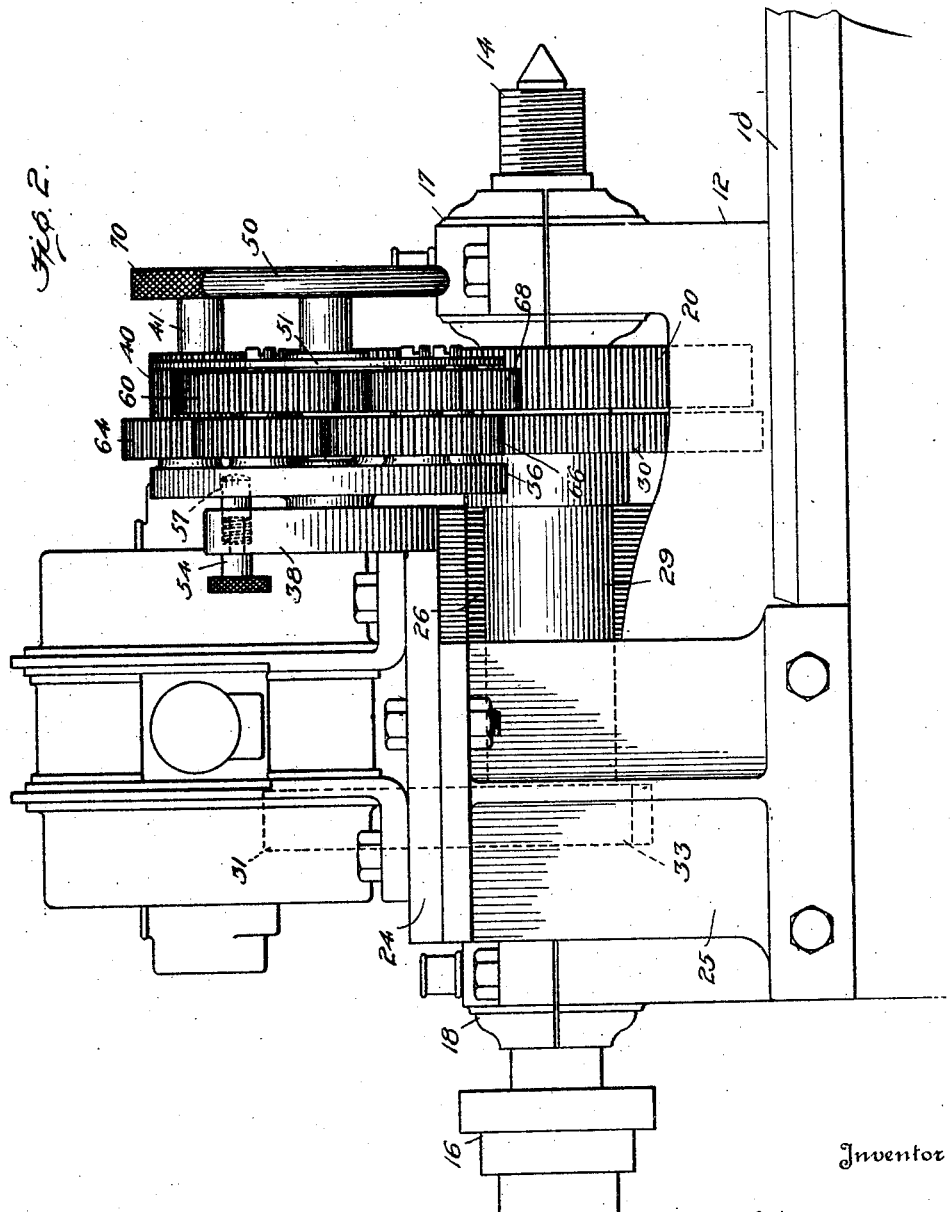

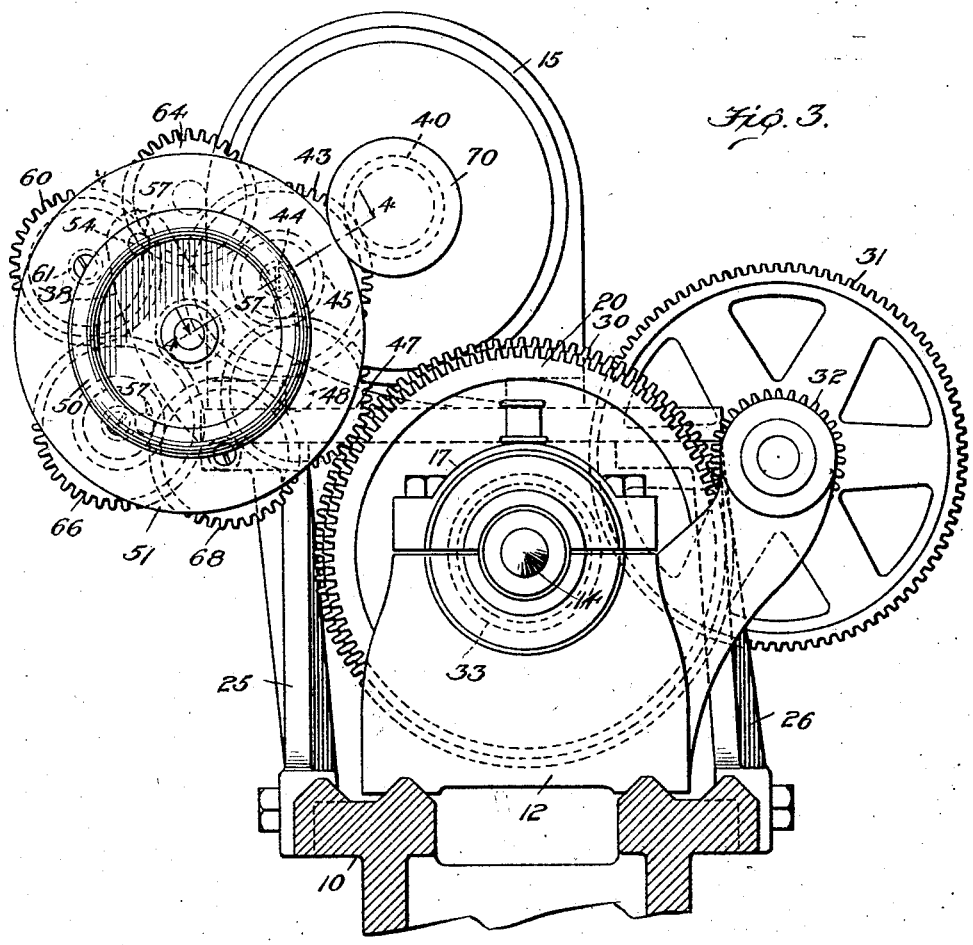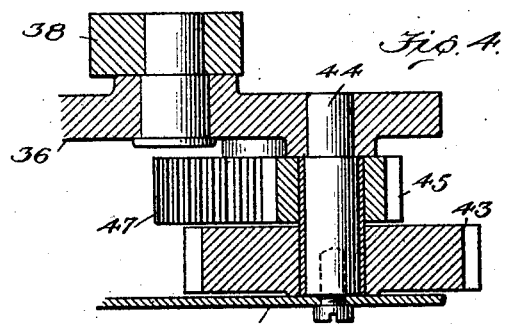

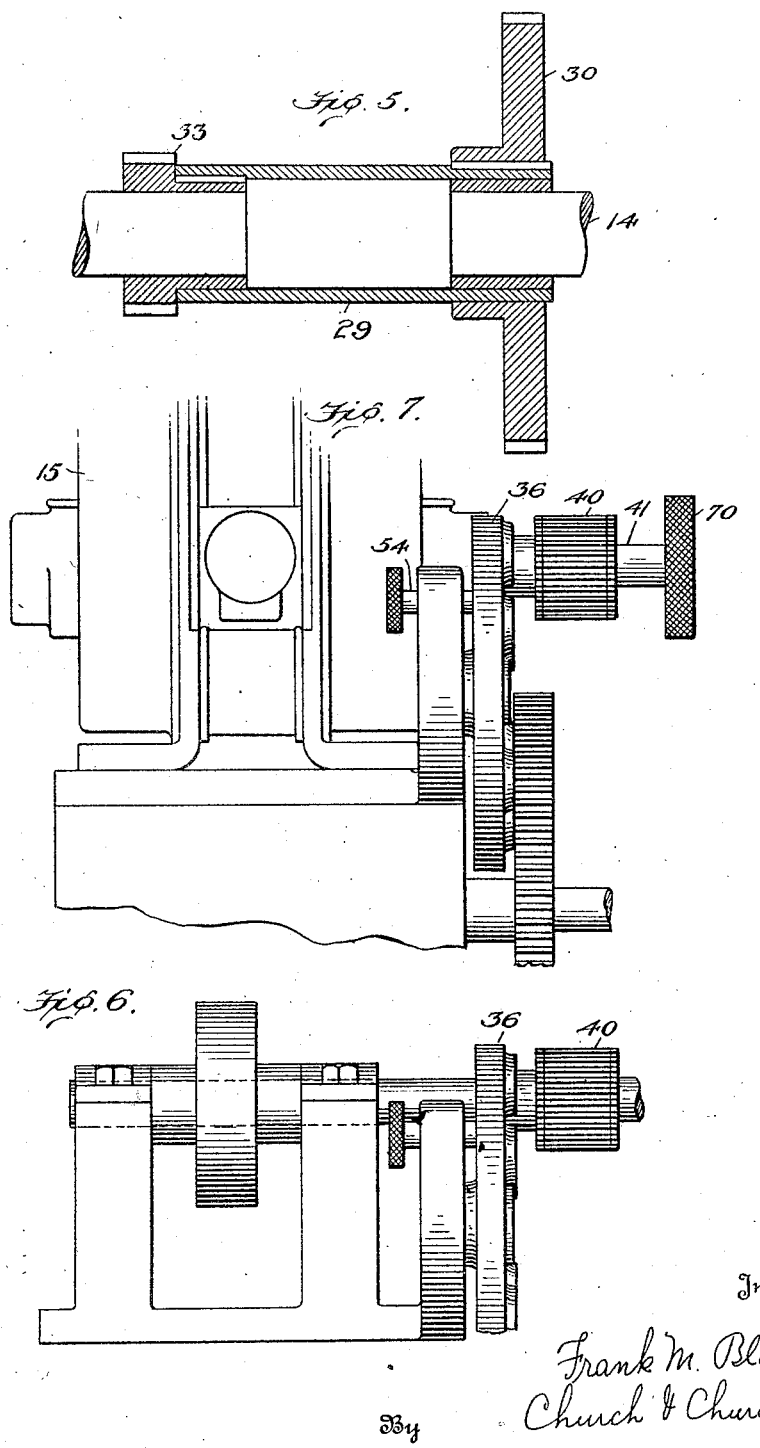

1,534,896

UNITED STATES PATENT OFFICE.

FRANK M. BLAIR, OF NEWARK, OHIO, ASSIGNOR OF ONE-HALF TO FREDERIC M. BLACK, OF NEWARK, OHIO.

TURRET-TYPE TRANSMISSION.

Application filed April 18, 1922. Serial No. 554,940.

*To all whom it may concern:*

Be it known that I, FRANK M. BLAIR, a citizen of the United States, residing at Newark, in the county of Licking and State of Ohio, have invented certain new and useful Improvements in Turret-Type Transmissions; and I do hereby declare the following to be a full, clear, and exact description of the same, reference being had to the accompanying drawings, forming part of this specification.

This invention relates to transmission mechanism of the variable speed type for driving lathes or other tools from a prime mover. The object of the present invention is to provide a simple means of changing a belt-driven machine to a motor-driven machine and in providing a considerable number of speed changes in order that the device may be used in connection with a single speed motor or with a constant speed wide faced pulley. In the older types of lathes, power is transmitted to the lathe through a cone pulley which accommodates a relatively narrow belt and requires a shifting of the belt from cone to cone in order to secure the various speeds necessary in the operation of the lathe. The present invention adds a simple transmission to the machine replacing the cone pulley ordinarily used and permitting the substitution of a wide faced pulley thus allowing for the use of a belt of suitable width eliminating all shifting of the belts required in the cone-driven type and making an all-gear head lathe with constant belt speed.

A further object of the invention is the provision of a transmission mechanism such as to enable a customer to start with either a constant speed gear driven type, or a motor driven type or a cone driven type either of which can readily be changed into the other type by the substitution of a minimum number of parts.

In the drawings,—

Figure 1 is a plan view of a portion of a lathe fitted with the present invention.

Fig. 2 is a side elevation of the parts shown in Fig. 1.

Fig. 3 is an end view thereof.

Fig. 4 is a section taken on line 4—4 of Fig. 3.

Fig. 5 is a vertical section through the drive gear and sleeve.

Fig. 6 is a modification showing the use of a belt drive.

Fig. 7 is a further modification showing the motor mounted on a sub-base, illustrating a type convenient for use as a variable speed device for driving rolls in paper mills, or for similar purposes.

The lathe bed 10, headstock 12, and spindle 14 are of the usual type and in fact the lathe shown is of standard construction save for the provision of the motor 15 and the transmission mechanism. The cone pulley 16 drives the feed screw in the customary manner, these members forming no part of the present invention.

The spindle 14 is supported in bearings 17 and 18 and carries a large sleeve gear 30 which receives power from the motor 15 through the transmission mechanism forming the principal subject matter of the present invention.

The motor 15 is carried by a base 24 bolted to a front bracket 25 and a rear bracket 26, these brackets being secured to the lathe bed by bolts or other fastenings. A sleeve 29 surrounds the spindle 14 and has keyed to it a gear 30 which meshes selectively with certain of the gears on the transmission plate or disk. The back gears 31 and 32 mesh respectively with the small spindle 33 and the large gear 20, the back gears being thrown in and out of mesh by means of the usual handle 35.

The change speed gear carrier 36 is in the nature of a plate or disk rotatably mounted on a support 38 carried by the motor base 24. On the disk 36 is mounted a plurality of studs here shown as six in number on which are mounted the gears making up the transmission train.

Referring particularly to Fig. 3, the pinion 40 is mounted on the armature shaft 41 and is shown in mesh with a gear 43 mounted on stud 44. This gear 43 is a compound gear having a smaller wheel 45 adjacent the disk or carrier 36, the gear 45 constantly meshing with a single gear 47 on stud 48 which may be somewhat shorter than the stud 44. In the position shown in Fig. 3 the single gear 47 is in mesh with the large sleeve gear 30 which is carried by the spindle 14, this combination reducing the speed from 1200 R. P. M. of the motor armature shaft 21 to 14 revolutions of the spindle 14 if the back gear is in mesh and to 114 revolutions with the back gear inoperative.

The hand wheel 50 is secured to a protecting cover 51 which ties together and supports the various studs such as 44, thereby enabling the operator to shift the carrier 36 about its axis by means of the hand wheel 50 so as to bring the desired gears into engagement in order to secure a train giving the correct speed ratio. For convenience a spring pressed plunger 54 is mounted in an arm 55 carried by the motor support and locks the carrier 36 in position by fitting within one of the holes 57 in the carrier. It is found convenient to place numerals such as 58 on the periphery of the carrier so that when they are brought into registry with an arrow or other indicator 59 they will denote that the carrier is in correct position at which time the plunger 54 will be in registry with the hole 57. It is obvious that the spring pressed plunger 54 may be replaced by a threaded pin or other device for affording a secure lock between the frame and the carrier.

The compound gear 60 mounted on stud 61 is similar, save in diameter, with the compound gear 43 and drives a single gear 64 which meshes with the large sleeve gear 30 when the compound gear 60 is in mesh with the pinion 40 of the motor. The compound gear 66 and the single gear 68 driven thereby are similar to the gears heretofore described except in diameter; a typical example of sizes being twenty-two teeth for the pinion 40, forty-five and twenty teeth for the compound gear 43 with thirty-five teeth for the single gear 47; thirty-five and thirty teeth for the compound gear 60, with thirty teeth on the follower or idle gear 64; and forty and twenty teeth on the compound gear 66 with thirty-five teeth on the single idle gear 68, this selection of teeth with a 100-toothed large sleeve gear giving a speed reduction with a 1200 R. P. M. motor of 114, 220, 500, with the back gear disengaged and approximately 14, 71, and 165 with the back gear engaged. The small knurled wheel 70 is on an extension of the armature shaft and is convenient for turning over the spindle by hand.

Each alternate gear in the transmission is preferably made of fiber in order to reduce the amount of noise to a minimum, but while this is the preferred structure it is not essential and the device may be used with all steel gears if so desired.

What I claim is:

1. In a transmission, a drive member, a driven member, a pivotally mounted disk, a plurality of compound gears on said disk adapted to selectively engage said drive member, a plurality of single gears each meshing with one of said compound gears, and means for moving said disk to bring a chosen single gear into mesh to drive said driven shaft.

2. In a transmission mechanism, a rotatable disk, a plurality of compound gears mounted on said disk on one side thereof and a plurality of single gears mounted on the same side of said disk, a drive shaft, a pinion on said shaft meshing selectively with a chosen one of said compound gears, a driven shaft, and means connecting said driven shaft in operative relation with a chosen one of said single gears.

FRANK M. BLAIR.